UNITED STATES PATENT OFFICE.

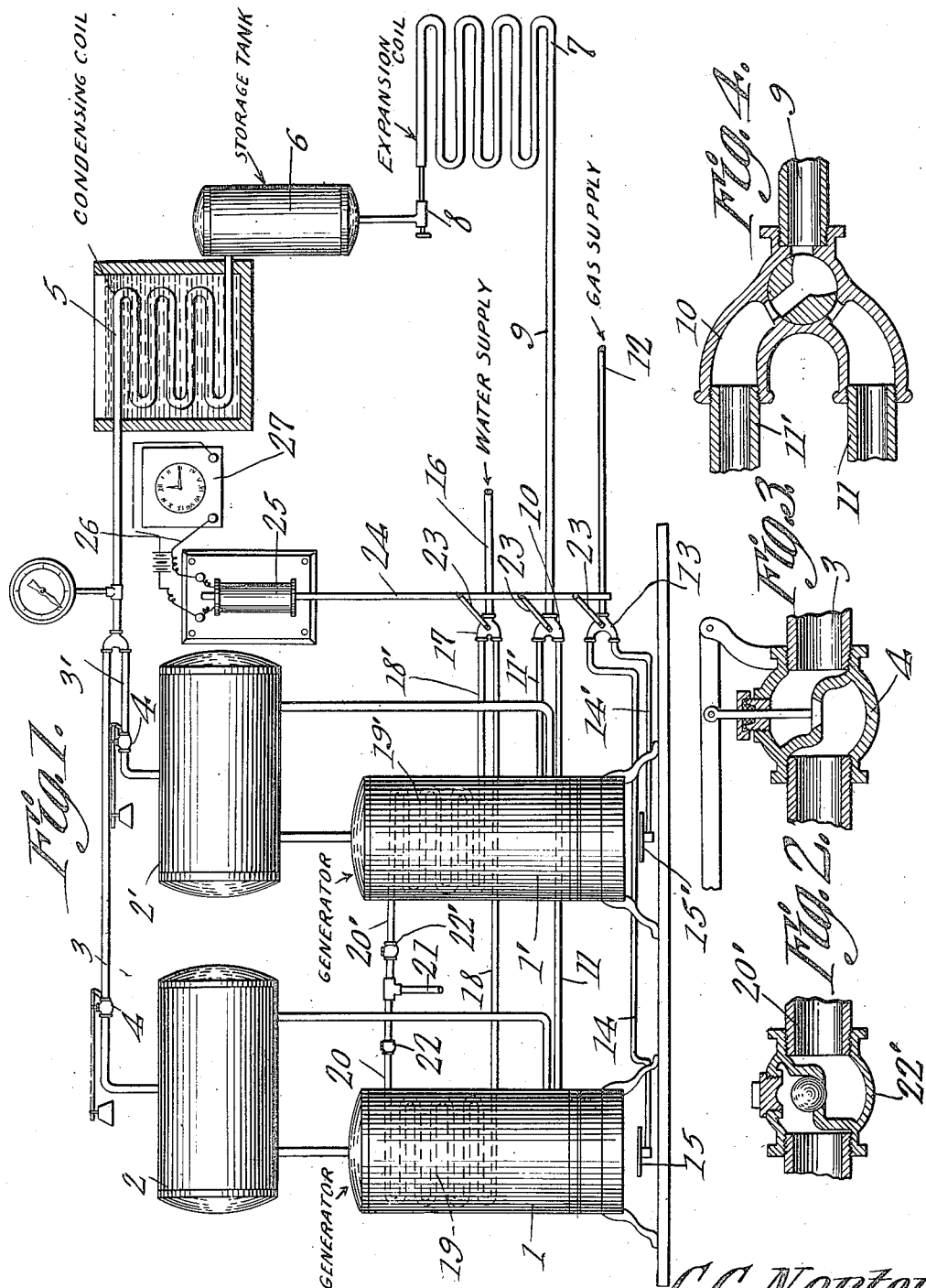

CHARLEY CARTER NORTON, OF MEMPHIS, TENNESSEE.

ABSORPTION REFRIGERATING APPARATUS.

1,151,035.　　　　Specification of Letters Patent.　　Patented Aug. 24, 1915.

Application filed May 26, 1914. Serial No. 841,169.

*To all whom it may concern:*

Be it known that I, CHARLEY C. NORTON, a citizen of the United States, residing at Memphis, in the county of Shelby and State of Tennessee, have invented a new and useful Absorption Refrigerating Apparatus, of which the following is a specification.

The present invention appertains to an absorption refrigerating apparatus, and aims to provide a novel and improved automatic apparatus of that nature.

The present invention contemplates the provision of an absorption refrigerating apparatus including duplicate generators or stills, connected to the condensing and expansion coils, in circuit therewith, in combination with novel means for alternately heating and cooling the generators or retorts, whereby the generators will alternately volatilize the ammonia, and whereby the generators will also be alternately cooled for creating vacuums therein to draw the ammonia from the expension coil, without the intervention of a pump or the like.

Another object of the present invention is to provide a refrigerating apparatus of the character specified, which will have a practically continuous or steady operation, thereby avoiding an intermittent or recurring operation, which is objectionable for obvious reasons.

It is also within the scope of the present invention to provide an absorption refrigerating apparatus which will be improved generally in its construction, to enhance the utility of the apparatus.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein—

Figure 1 is a diagrammatic view of the apparatus. Fig. 2 is an enlarged sectional detail of one of the check valves for the water or generator cooling pipes. Fig. 3 is an enlarged sectional detail of one of the pressure or escape valves. Fig. 4 is an enlarged sectional detail of one of the two-way valves employed in carrying out the present invention.

The present apparatus embodies duplicate generators or stills. Thus, there are employed generator tanks 1 and 1' having the upper auxiliary tanks or drums 2 and 2', respectively. The tanks or drums 2 and 2' are provided with upper discharge pipes 3 and 3', respectively, for the volatilized ammonia, each of the pipes 3 and 3' being provided with a pressure or escape valve 4 of any suitable construction, and adapted to be opened under a predetermined pressure of the volatilized ammonia within the particular generator, to enable the ammonia vapor to pass the valve and enter the condensing coil 5 to which the pipes 3 and 3' are connected.

A storage tank or receiver 6 is connected to the discharge end of the condensing coil 5, the condensing coil being cooled by water, or other cooling medium. To the lower end or bottom of the storage tank or receiver 6 is connected the receiving end of the expansion coil 7, a controlling valve 8 being interposed between the tank or receiver 6 and the expansion coil.

The discharge end 9 of the expansion coil is connected to a two-way valve 10, as illustrated in detail in Fig. 4, and which has connected thereto a pair of pipes 11 and 11'. The pipes 11 and 11' are connected to the generator or retort tanks 1 and 1', respectively.

It will thus be observed that the generators are in circuit with the condensing coil, storage tank or receiver, and the expansion coil, the generators, however, shunting each other between the receiving end of the condensing coil and the discharge end of the expansion coil. When the two-way valve 10 is actuated, the same will alternately bring the inlet pipes 11 and 12 of the respective generators into communication with the expansion coil, for the purposes which will hereinafter appear.

Means are provided for alternately heating and cooling the respective generators or stills, one generator being heated while the other is cooled.

The means for heating the generators or stills includes a gas supply pipe 12, leading to any suitable source of gas or fuel supply, and connected to a two-way valve 13, similar to the two-way valve 10. Branches 14 and 14' are connected to the two-way valve 13 and are connected to burners 15 and 15' disposed below the respective generating tanks 1 and 1'. Suitable pilots or automatic burners may be provided for the burners or heaters 15 and 15', which need not be described or illustrated in detail inasmuch as they are well known in the art.

The cooling means for the generators, include the water or cooling fluid supply pipe 16, connected to a two-way valve 17 similar to the valves 10 and 13, branches 18 and 18' being connected to the valve 17 and to the coils 19 and 19' disposed within the respective tanks 1 and 1'. The discharge ends 20 and 20' of the cooling coils 19 and 19', respectively, are preferably connected with a common discharge or drain pipe 21, and are also provided with the respective check valves 22 and 22', for enabling the water to escape from the coils 19 and 19' through the discharge pipe 21, but preventing the water from being forced from one of the coils 19—19', to the other past the discharge or drain pipe 21.

When the two-way valve 13 is actuated, the same alternately brings the supply pipe 12 of the gas or fuel, into communication with the branches 14 and 14' leading to the respective burners 15 and 15', and similarly, when the valve 17 is actuated, the same will alternately bring the water or cooling agent supply pipe 16 into communication with the branches 18 and 18' leading to the respective cooling coils 19 and 19' within the generators.

There is provided a mechanism for automatically oscillating or actuating the valves 10, 13 and 17, at suitable intervals, or periodically, and to this end, the arms or levers 23 of the valves 10, 13 and 17 are connected to a rod 24 which is extended into a core for a solenoid 25 which is interposed in an electrical circuit 26. The electrical circuit 26 has interposed therein a suitable time switch 27, which is controlled by a suitable clock, for reversing the current through the solenoid 25 at predetermined intervals. Thus, when the current traverses the solenoid 25 in one direction, the core rod 24 will be raised or elevated, as seen in Fig. 1, to bring the branches 18, 11 and 14' into communication with the respective pipes 16, 9 and 12. Conversely, when the current traverses the solenoid 25 in the other direction, the rod 24 will be depressed, to bring the branches 18', 11' and 14 into communication with the respective pipes 16, 9 and 12.

In operation, supposing the generator or still 1' to be filled with anhydrous ammonia or other refrigerating fluid or agent, and supposing the rod 24 to be raised, as seen in Fig. 1, then the burner or heater 15' will be supplied with gas to heat the generator 1', the expansion coil 7 will be in communication with the generator 1, and at the same time, the water supply pipe 16 will be in communication with the cooling coil 19 of the generator 1. Now, as the generator 1' becomes heated, the ammonia or refrigerating agent will become volatilized, and when the pressure reaches a predetermined number of pounds, the valve 4 of the discharge pipe 3' will be forced open, and the ammonia vapor may pass through the condensing coil 5 from the generator 1'. The ammonia vapor passing through the condensing coil, will be cooled, and will condense, so as to flow by gravity into the storage tank or receiver 6. The valve 8 controls the flow of the liquefied or condensed ammonia from the storage tank or receiver 6 into the expansion coil 7. The expansion coil 7 may be employed for absorbing the heat units of brine or other non-congealable liquid, for the usual refrigerating purposes. After the generator 1' has been in operation for a predetermined period of time, governed by the time switch 27, the electrical current through the circuit 26 will be reversed, so as to depress the rod 24, and to reverse the valves 17, 10 and 13. Then, the burner or heater 15' will be shut off, and the gas will flow to the burner or heater 15 of the generator 1. At the same time, the water supply will be shut off from the generator 1, and will be established through the coil 19' of the generator 1', the generator 1' also being brought into communication with the expansion coil 7. With this condition of the apparatus, the generator 1 will now be heated, to volatilize the ammonia, and at the same time, the contents of the generator 1' will be cooled, due to the flow of the water or other cooling agent through the coil 19'. Consequently, a vacuum will be created within the generator 1' which will draw or suck the ammonia from the expansion coil 7. In this manner, the ammonia is drawn into and through the expansion coil, the ammonia being fed from the storage tank or receiver 6 into the expansion coil through the valve 8. At the same time, the generator 1 on being heated, will vaporize the ammonia therein and when the pressure reaches a predetermined degree, the valve 4 of the discharge pipe 3 will be forced open, to admit the ammonia vapor into the condensing coil 5. Thus, as the controlling rod 24 is reciprocated periodically, the two generators will be alternately heated and cooled, for furnishing a practically continuous supply of ammonia vapor into the condensing coil, and for continually drawing the ammonia from the expansion coil either to one generator or the other, and without the assistance of a pump, or its equivalent.

The advantages of the present apparatus will be obvious to those versed in the art, and it is also manifest that the present apparatus has various capabilities, it being particularly adapted for use in small ice or refrigerating plants, without the necessity of an engine being employed for driving a pump, as usual.

Having thus described the invention, what is claimed as new is:

In a refrigerating apparatus, a condensing coil, an expansion coil connected thereto, a pair of stills having discharge pipes connected to the condensing coil, an escape valve interposed in each of the said discharge pipes, a two-way valve connected to the discharge end of the expansion coil, branches connecting the said two-way valve and the stills, a gas burner for each still, a two-way gas valve, branches connecting the two-way gas valve and the burners, a cooling coil for each still, a two-way water valve, branches connecting the two-way water valve and the cooling coils, and actuating means connected to all of the said two-way valves and operable periodically for bringing the burner of one still into operation, and simultaneously bringing the other still into communication with the expansion coil and opening the passage through the cooling coil of the last mentioned still.

In testimony that I claim the foregoing as my own, I have hereto affixed my signature in the presence of two witnesses.

CHARLEY CARTER NORTON.

Witnesses:
H. W. FARBRACHE,
C. SCHAEDLE.